United States Patent
Hedley et al.

(10) Patent No.: US 10,493,799 B2
(45) Date of Patent: Dec. 3, 2019

(54) WHEEL NUT FITTING AND/OR REMOVAL APPARATUS AND METHOD

(71) Applicant: Justoy Pty Ltd, Mount Thorley, NSW (AU)

(72) Inventors: Robert Ian Hedley, Buttaba (AU); Christopher Nash Whybin, Queensland (AU); Drew Colvin Keith, Singleton Heights (AU)

(73) Assignee: Justoy Pty Ltd, Mount Thorley, NSW (AU)

(*) Notice: Subject to any disclaimer, the term of this patent is extended or adjusted under 35 U.S.C. 154(b) by 159 days.

(21) Appl. No.: 15/739,895

(22) PCT Filed: Jul. 1, 2016

(86) PCT No.: PCT/AU2016/050576
§ 371 (c)(1),
(2) Date: Dec. 26, 2017

(87) PCT Pub. No.: WO2017/004665
PCT Pub. Date: Jan. 12, 2017

(65) Prior Publication Data
US 2018/0361788 A1    Dec. 20, 2018

(30) Foreign Application Priority Data
Jul. 3, 2015  (AU) ................................ 2015902612

(51) Int. Cl.
*B60B 29/00* (2006.01)
*B60C 25/132* (2006.01)

(52) U.S. Cl.
CPC .......... *B60B 29/001* (2013.01); *B60B 29/002* (2013.01); *B60B 29/003* (2013.01); *B60B 29/007* (2013.01); *B60C 25/132* (2013.01)

(58) Field of Classification Search
CPC ... B60B 29/007; B60B 29/001; B60B 29/002; B60B 29/003; B60C 25/132
See application file for complete search history.

(56) References Cited

U.S. PATENT DOCUMENTS 3,577,818 A * 5/1971 Cramer ................. B60B 29/003
                                                                    81/462
4,553,456 A * 11/1985 Rafert ................... B60B 29/007
                                                                    81/462

(Continued)

FOREIGN PATENT DOCUMENTS

JP      2000-210825 A    8/2000
WO    WO1989/010273 A1  11/1989

(Continued)

OTHER PUBLICATIONS

International Search Report corresponding to PCT/JP2016/050576, dated Sep. 12, 2016, 5 pages.

*Primary Examiner* — Jason L Vaughan
(74) *Attorney, Agent, or Firm* — Kilpatrick Townsend & Stockton LLP

(57) ABSTRACT

An apparatus (10) for fitting and/or removing wheel nuts. The apparatus (10) includes a base structure that supports a movable wheel engaging portion, the wheel engaging portion including a socket wrench (23) and a positioning device, wherein the positioning device can be used to locate the wheel engaging portion to aid the socket wrench (23) to fit or remove a wheel nut.

15 Claims, 15 Drawing Sheets

(56) References Cited

U.S. PATENT DOCUMENTS 5,123,312 A * 6/1992 Brawand ............... B60B 29/003
                                                      81/180.1
7,121,175 B2 * 10/2006 Anderson ............. B60B 29/005
                                                       81/462
9,278,438 B2 * 3/2016 Robinson ................ B25B 23/00

FOREIGN PATENT DOCUMENTS

| WO | WO2009/096239 A1 | 8/2009 |
| WO | WO2012/094706 A1 | 7/2012 |
| WO | WO2015/003204 A1 | 1/2015 |

* cited by examiner

WHEEL NUT FITTING AND/OR REMOVAL APPARATUS AND METHOD

TECHNICAL FIELD

The present invention generally relates to an apparatus and method for fitting and/or removing wheel nuts.

BACKGROUND

Mining vehicles such as haul trucks, just like many other vehicles, require wheels to be removed at various times, such as when replacement of tyres is necessary. Such mining vehicles pose particular problems and hazards, however, particularly due to their large size.

The wheels of mining vehicles are generally far too large for people to move, requiring specialist machinery to lift and carry the wheels to be fitted or once wheel nuts are removed. However, the operator fitting or removing the wheel nuts is in danger if the wheel falls during the fitting or removal process. In fact, workers are sometimes killed from such accidents.

Each wheel may also be held in place by a large number of nuts, often over 30 for a single rim. This makes the process of removing even a single wheel a time consuming and therefore expensive operation.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

SUMMARY

The present invention seeks to provide an apparatus and method for fitting and/or removing wheel nuts that improves the safety of personnel.

According to one aspect, there is provided an apparatus for fitting and/or removing wheel nuts, the apparatus including a base structure that supports a movable wheel engaging portion, the wheel engaging portion including a socket wrench and a positioning device, wherein the positioning device can be used to locate the wheel engaging portion to aid the socket wrench to fit or remove a wheel nut.

In a preferred form, the invention has the advantage of removing the need for persons to be located close to the wheel during fitting or removal.

According to another aspect, the wheel engaging portion supports the socket wrench and the positioning device on an annular rotatable member. Preferably, the positioning device is configured to locate the rotatable member in a position concentric to a wheel, such that rotation of the rotatable member allows the socket wrench to access subsequent wheel nuts.

In a preferred form, the socket wrench is movable in a direction towards or away from a central axis of the rotatable member. This allows the apparatus to be used on a range of wheels with different wheel nut locations. In one form, the rotatable member includes an annular control ring coaxial with the rotatable member, such that rotating the annular ring relative to the rotatable member causes the socket wrench to be moved relative to the rotatable member. This may provide for inward and outward movement, and in a situation where there are multiple socket wrenches they may all be moved simultaneously and automatically maintained at equivalent locations.

In one form, the socket wrench is extendable in a direction parallel to the axis of the rotatable member. This allows the socket wrench to reach a wheel nut, remove the wheel nut, and then retreat before being rotated to another location, without the need to move the entire apparatus or even the entire wheel engaging portion.

Preferably, the rotatable member has a central void, such that an inner wheel can be accessed by receiving an outer hub within the void. Also preferably, the apparatus includes a plurality of socket wrenches, which may be evenly spaced around the rotatable member.

In one form, the positioning device includes a rim engaging member. This ensures accurate positioning of the device, however in other forms the positioning device may include a remote sensor or another suitable means.

In a more preferred form, the apparatus is configured to automatically locate and remove all wheel nuts of a wheel fitted to a vehicle. In such a form, the apparatus may include a wheel nut collection device and/or a wheel nut supply device. Also preferably, the apparatus includes a wheel holding device.

According to one aspect, the apparatus is configured to fit or remove wheel nuts to or from a mining vehicle. Preferably, the apparatus is configured to fit or remove wheel nuts to or from an inner wheel of a haul truck.

According to one aspect, there is provided a method for fitting and/or removing wheel nuts, including the steps of positioning a wheel engaging portion of an apparatus using a positioning device; and removing a wheel nut using a socket wrench connected to the wheel engaging portion. In one form, the method further includes the step of rotating the wheel engaging portion, thereby allowing the socket wrench to fit/remove subsequent wheel nuts. Preferably, the method is performed using the apparatus defined herein.

BRIEF DESCRIPTION OF FIGURES

Example embodiments should become apparent from the following description, which is given by way of example only, of at least one preferred but non-limiting embodiment, described in connection with the accompanying figures, wherein.

DETAILED DESCRIPTION

Figure 1:
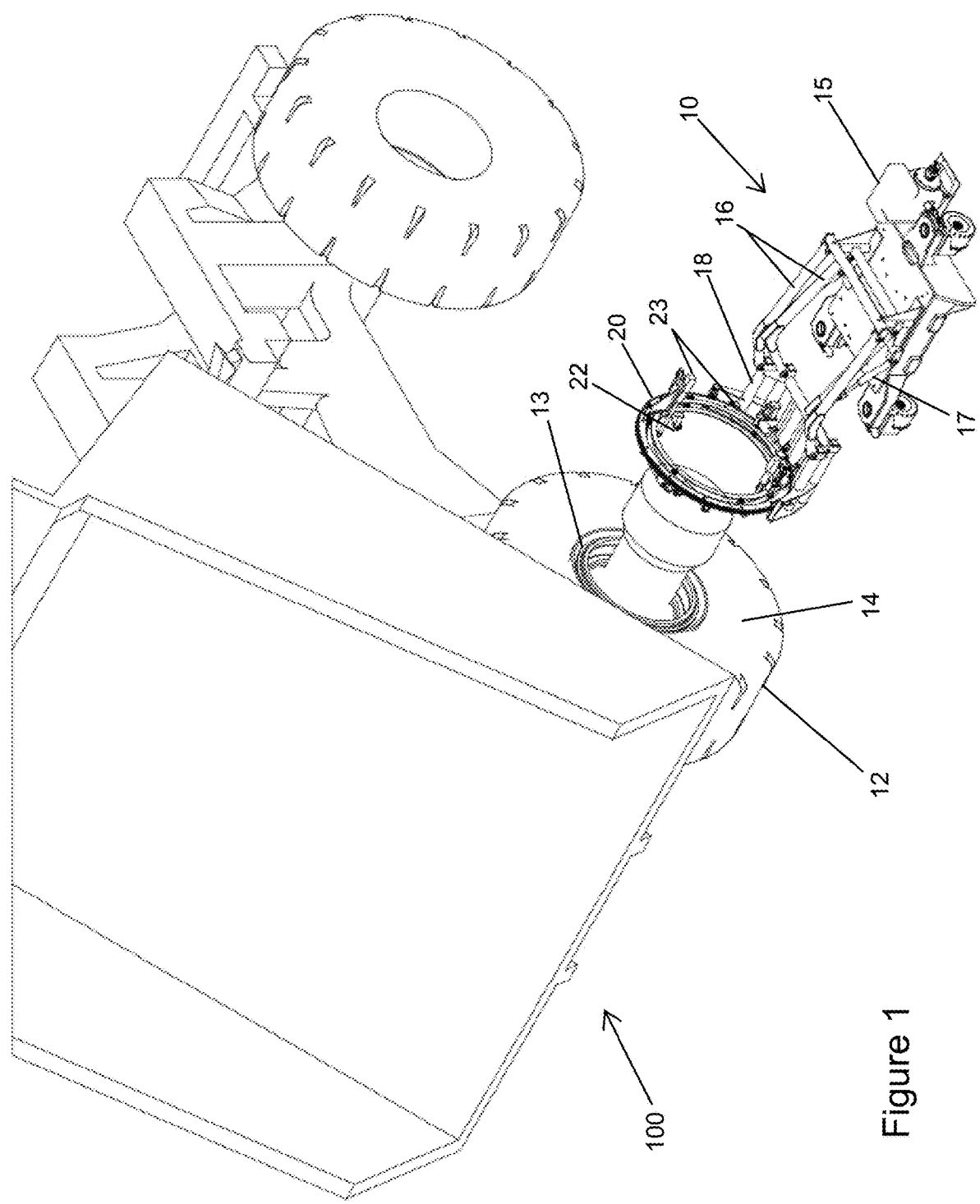
FIG. 1 illustrates a perspective view of an apparatus positioned near a haul truck prior to removal of wheel nuts.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

Referring to FIG. 1, a preferred embodiment of an apparatus 10 is shown positioned near an example of a mining vehicle, in this case a haul truck 100. The truck 100 has a wheel 12 fitted that includes a rim 13 and a tyre 14.

The apparatus 10 includes a base structure that includes a carrier vehicle 15 with lift arms 16 and lift actuator 17. The lift arms 16 connect to a wheel engaging portion, which includes a ring support frame 18 and a rotating ring assembly 20. The ring assembly 20 includes guide rollers 22 and socket wrenches 23, the operation of which will be described in more detail below.

Figure 2:
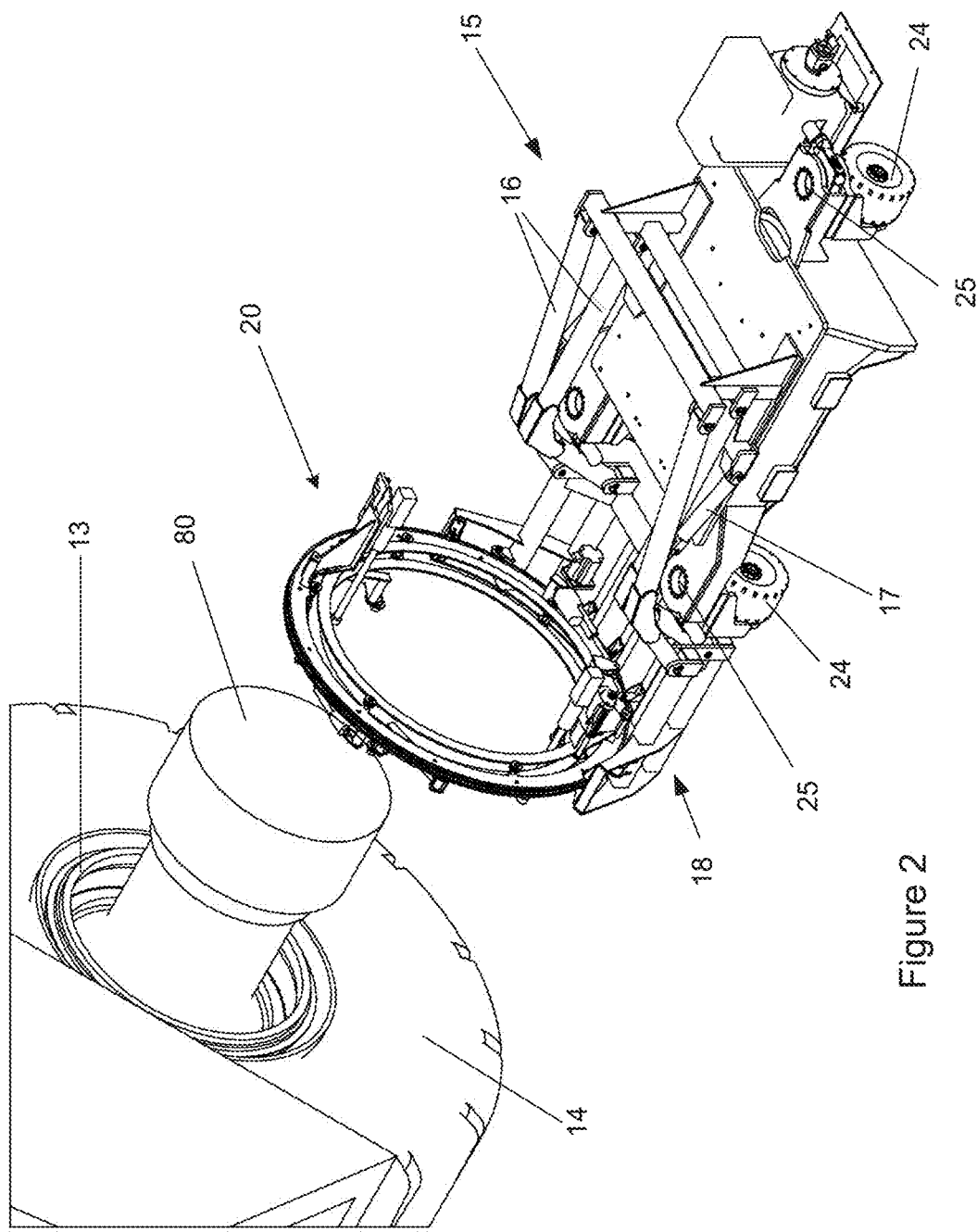
FIG. 2 illustrates a perspective view of the apparatus with a wheel engaging portion in a lowered position.

Referring to FIG. 2, the carrier vehicle 15 is movable over a substrate surface via wheels 24, each of which is pivotally mounted using a pivotal wheel mount 25. The wheel mounts 25 allow steering of the carrier vehicle 15 as well as movement in forward or sideways directions. This setup allows for easy manoeuvring of the carrier vehicle 15 to a position where it is close to and correctly aligned with the wheel 12 that is to be removed and then to subsequently move towards or away from the wheel 12.

Figure 3:
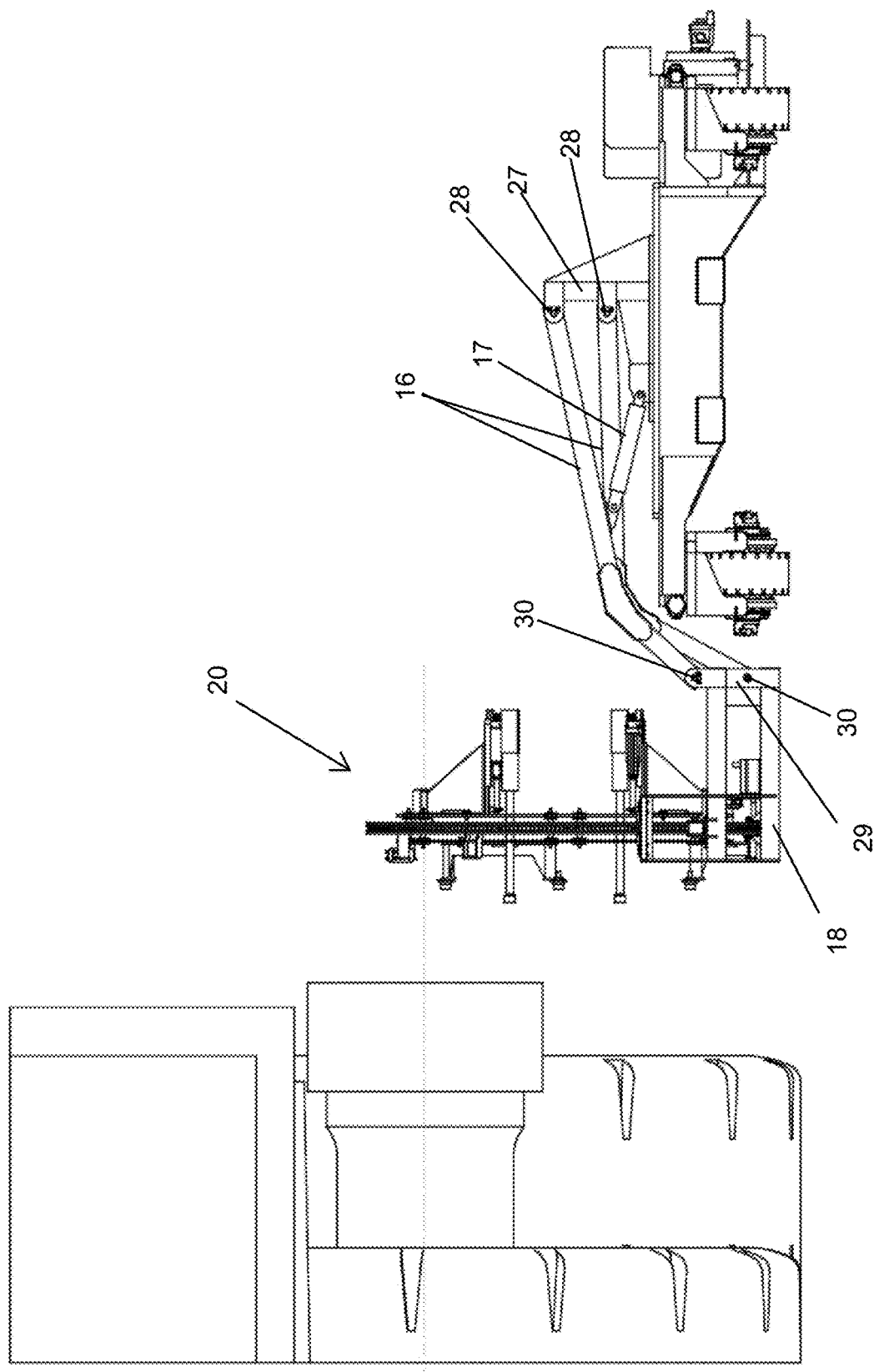
FIG. 3 illustrates a side view of the apparatus with the wheel engaging portion in the lowered position.

FIGS. 2 and 3 show the apparatus 10 with the ring assembly 20 in a lowered position. The ring assembly 20 can be raised and lowered using the lift actuator 17.

Referring to FIG. 3, the lift arms 16 are mounted to the carrier vehicle 15 by a vehicle mount 27 at pivot points 28. Similarly, the lift arms 16 connect to the ring support frame 18 by connecting to a support frame mount 29 at pivot points 30. The two sets of pivot points 28, 30 form a parallelogram, where the vehicle mount 27 and the support frame mount 29 are vertical. This configuration means that as the ring support frame 18 is raised and lowered, its orientation remains the same.

Figure 4:
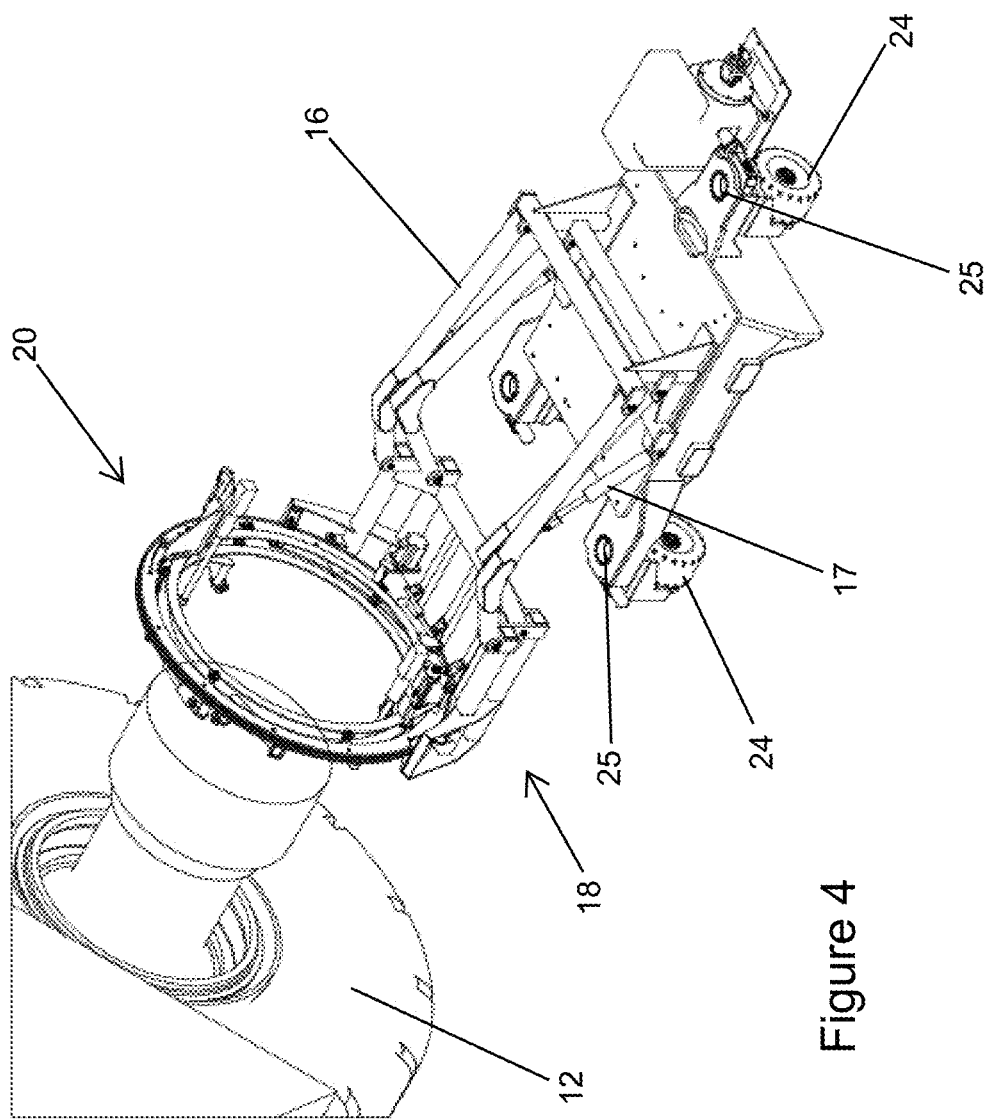
FIG. 4 illustrates a perspective view of the apparatus with the wheel engaging portion in a raised position.
Figure 5:
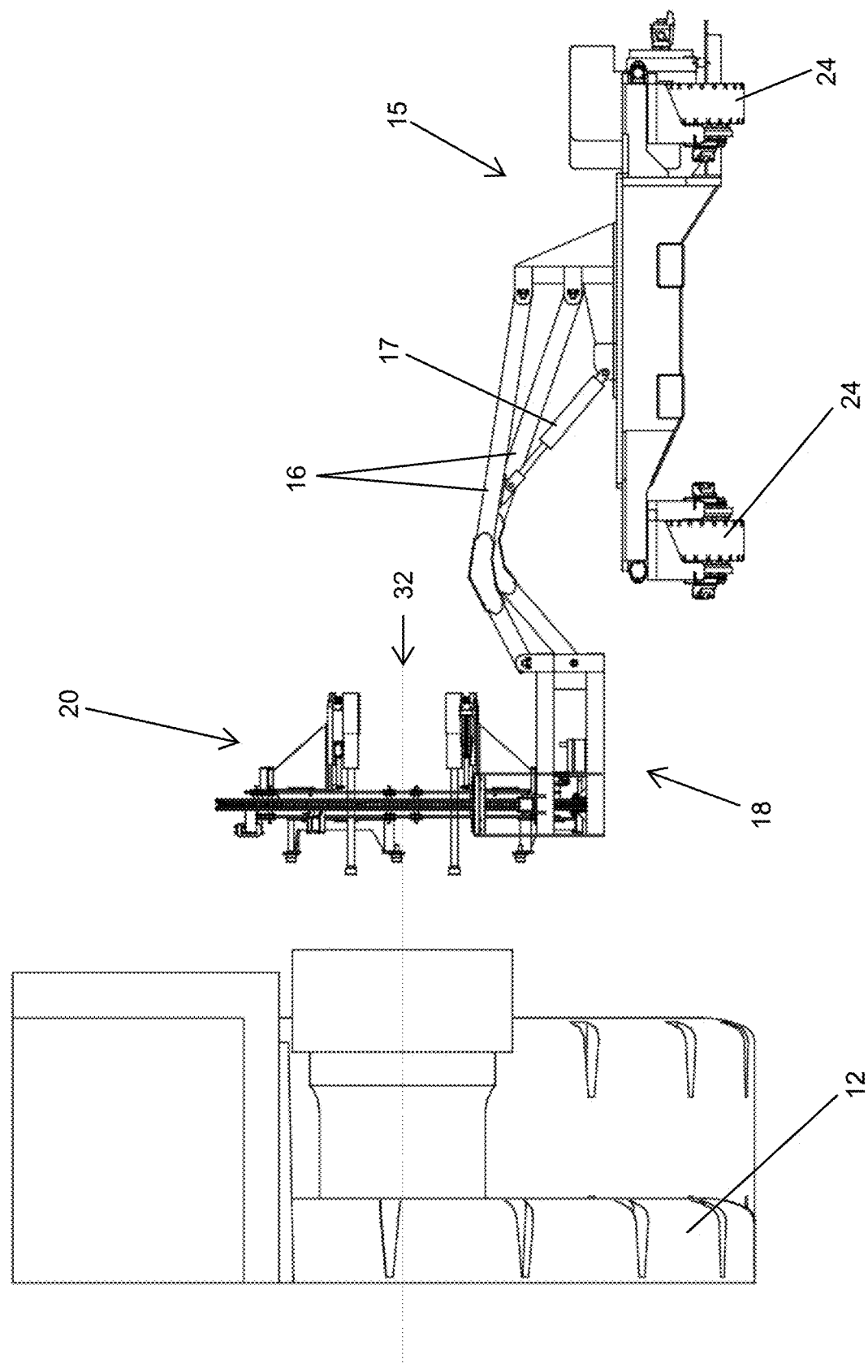
FIG. 5 illustrates a side view of the apparatus with the wheel engaging portion in the raised position.

The raising and lowering of the ring support frame 18 is achieved simply by extending or contracting the lift actuator 17, which acts on one of the lift arms 16. FIGS. 4 and 5 show the ring support frame 18, and therefore the ring assembly 20, in a raised position. By adjusting the height of the ring assembly 20 in this way, together with the positioning of the carrier vehicle 15 as described previously, a central axis of the ring assembly 20 can be aligned with an axis 32 of the wheel 12.

Figure 6A:
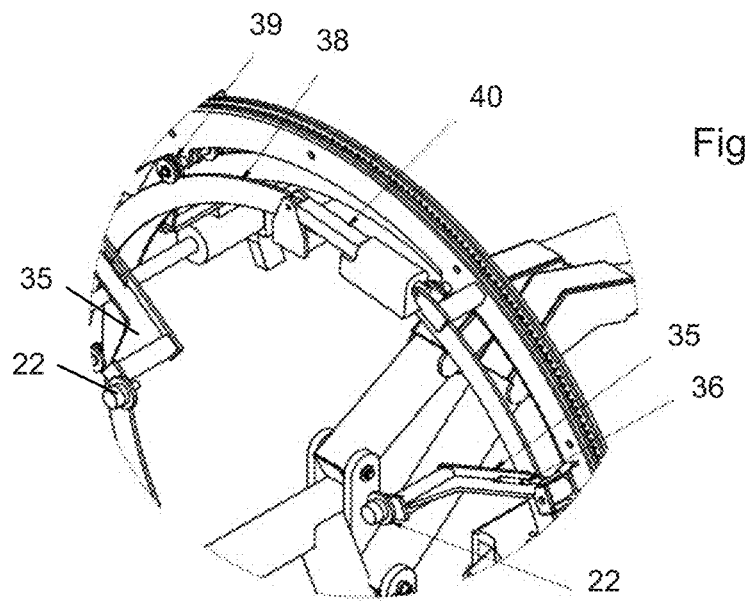
FIG. 6A illustrates a detailed enlarged view of detail A of FIG. 6.
Figure 6:
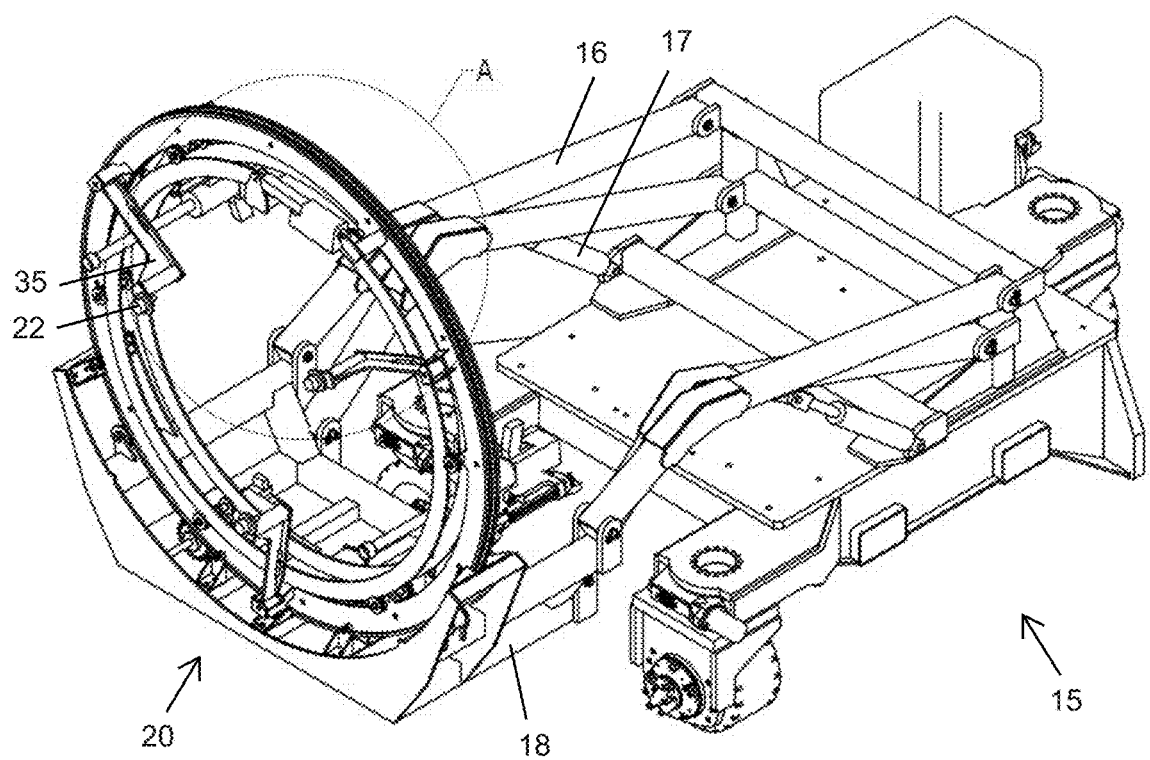
FIG. 6 illustrates a perspective view of the apparatus with a positioning ring actuator retracted, whilst
Figure 7:
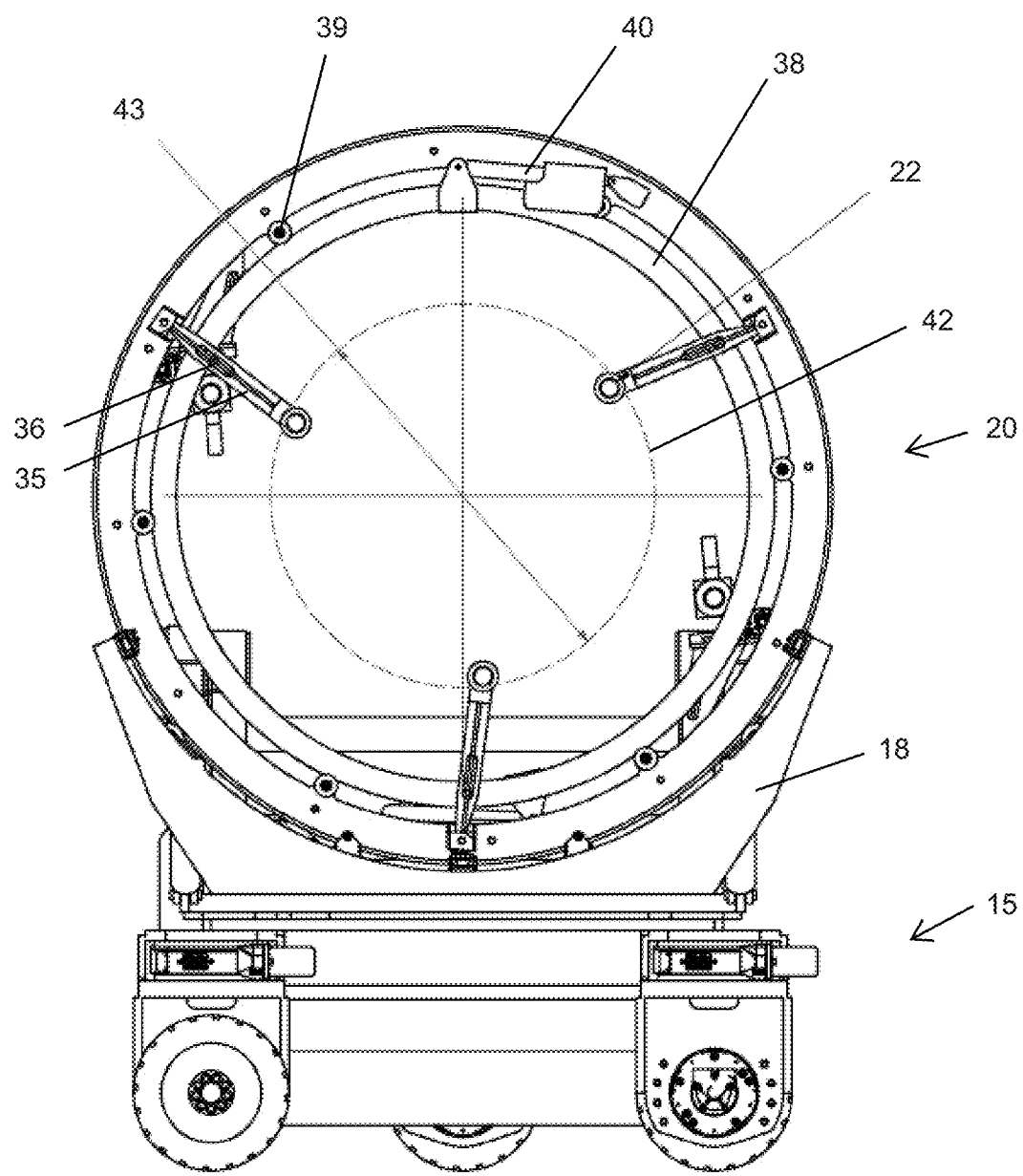
FIG. 7 illustrates a front view of FIG. 6.

Referring to FIGS. 6 and 7, the guide rollers 22 are shown in an inward position. While in this position, the carrier vehicle 15 can be driven forward so that the guide rollers 22 are within the rim 13.

As detailed in FIG. 6A, the guide rollers 22 are mounted on a roller arm 35 that has a slot 36. The ring assembly 20 has a positioning control ring 38 that is mounted using positioning ring rollers 39 and is movable using a positioning ring actuator 40. The positioning control ring 38 couples with the slots 36 so that rotation of the positioning control ring 38 causes inward or outward movement of the guide rollers 22. Therefore, movement of the control ring 38 simultaneously controls the position of all of the guide rollers 22.

FIG. 7 shows the positioning ring actuator 40 retracted (as in FIG. 6) so that the guide rollers 22 are close to an innermost position. In one example embodiment, a circle 42 created by the guide rollers 22 has a diameter 43 that is suited to fit small wheels 12, such as wheels 12 with a nominal inside rim diameter of 1100 mm. As mentioned above, the rollers 22 may also be moved to this position during positioning of the ring assembly 20.

Figures 8, 8A:
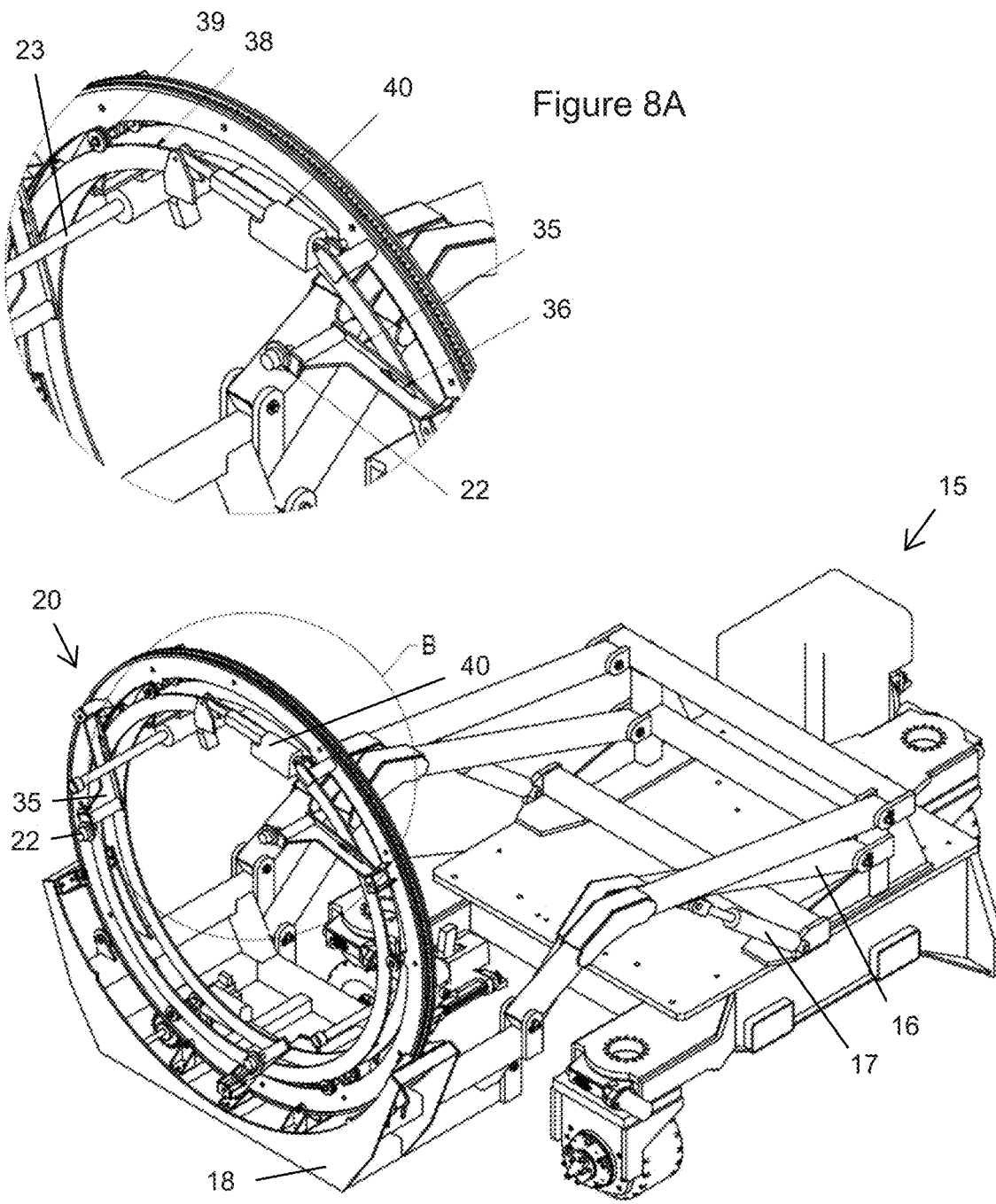
FIG. 8 illustrates a perspective view of the apparatus with the positioning ring actuator extended, whilst
FIG. 8A illustrates a detailed enlarged view of detail B of FIG. 8.
Figure 9:
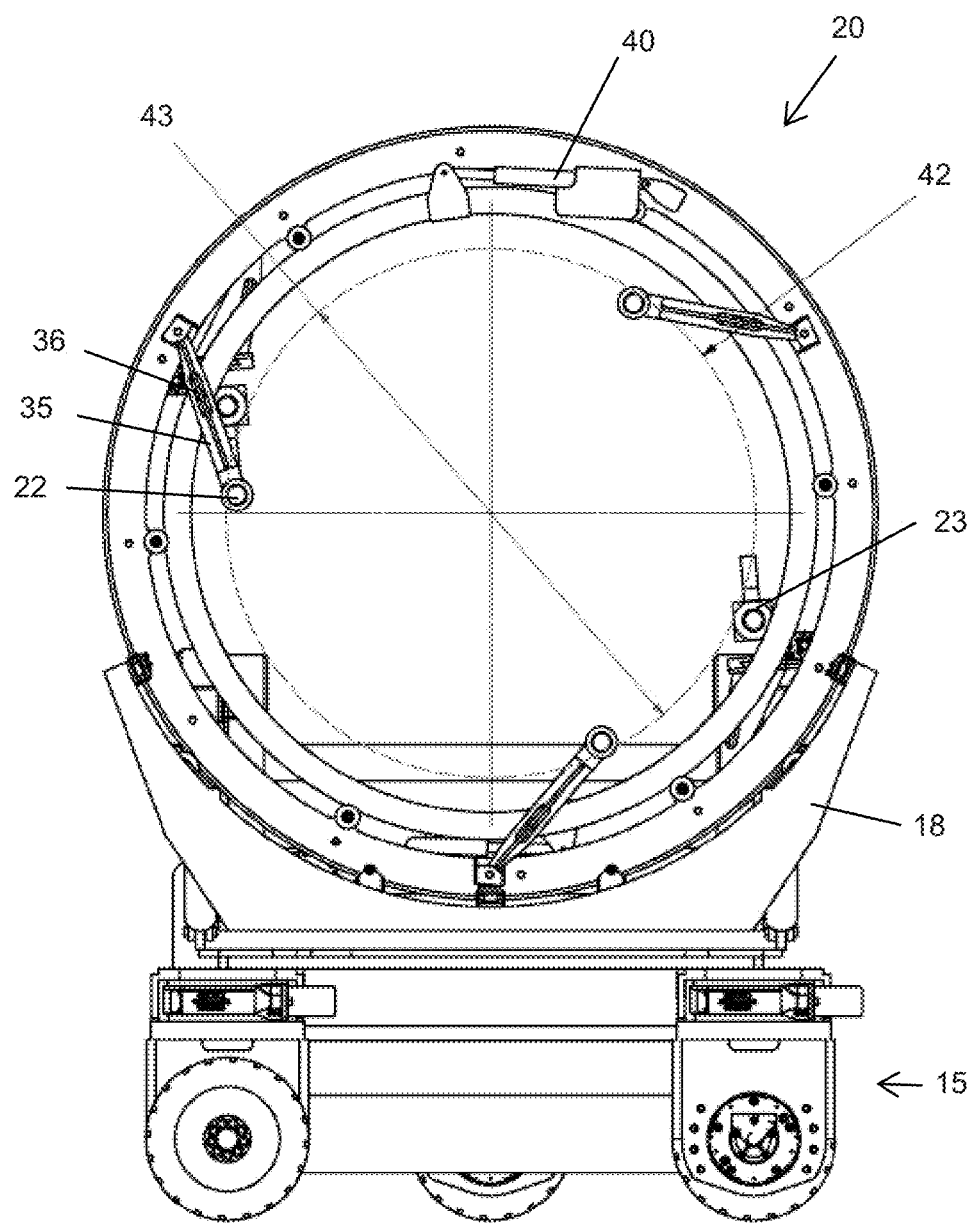
FIG. 9 illustrates a front view of FIG. 8.

FIGS. 8 and 9 show the actuator 40 extended. The guide rollers 22 are now in an outward position, so that the circle 42 (FIG. 9) has a larger diameter 43. In the example embodiment, this larger diameter 43 is suited to fit larger wheels 12, such as wheels 12 with a nominal inside rim diameter of 1450 mm.

The guide rollers 22 act as a positioning device, contacting the rim 13 and ensuring the ring assembly 20 is centered with respect to the wheel 12. In alternative embodiments, it is anticipated that different types of positioning devices could be used. For example, an alternative positioning device may not contact the rim 13 at all, relying instead only on sensors.

Figure 10:
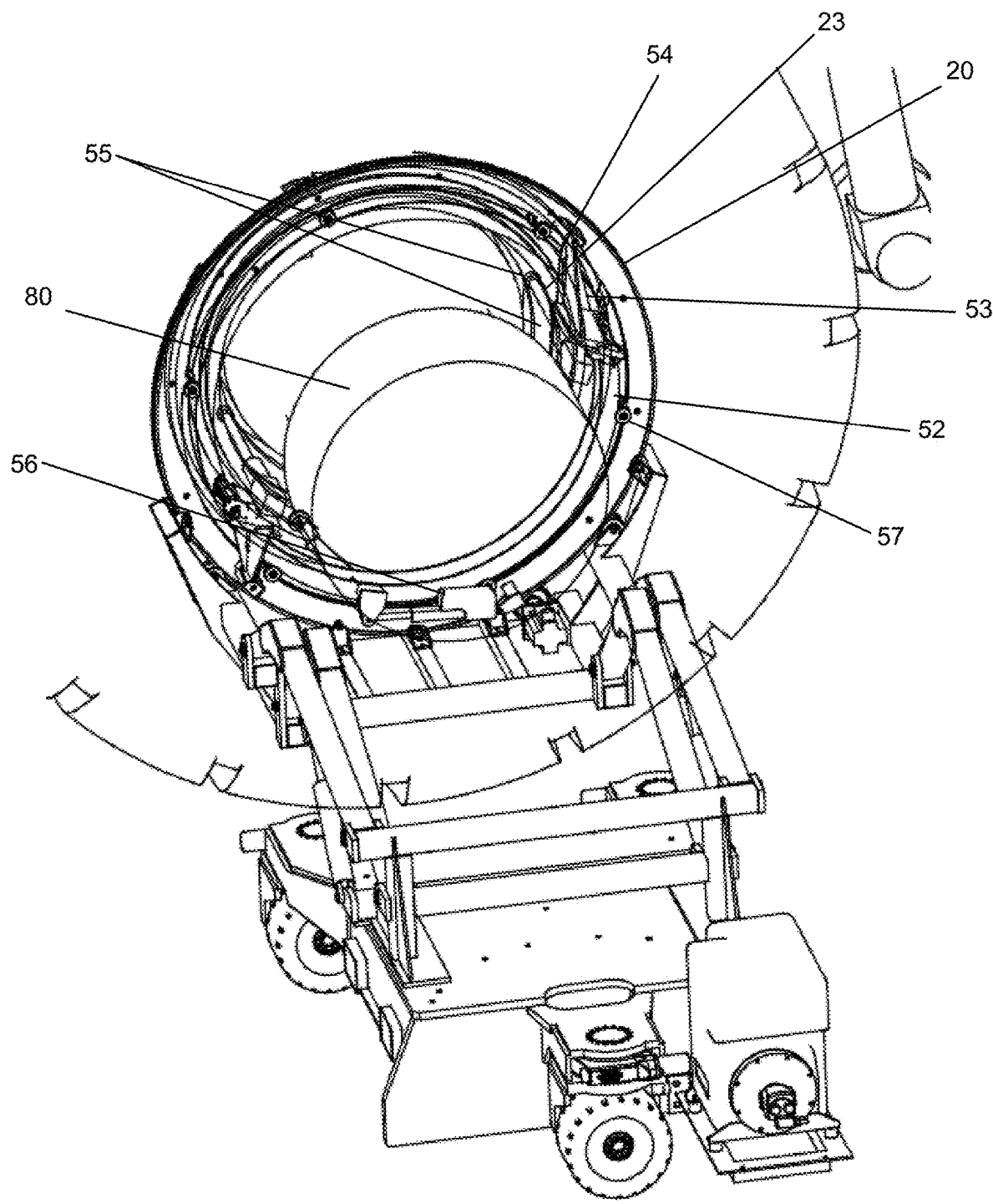
FIG. 10 illustrates a perspective view of the apparatus from substantially behind the apparatus.

Referring to FIG. 10, a socket wrench 23 is shown mounted to a wrench control ring 52 by a wrench arm 53. The socket wrench 23 in the present embodiment is an electric gun-style wrench, but in alternative embodiments may take any other suitable form, such as but not limited to an electric, air powered or other pneumatic impact driver or torque gun.

Similar to the setup of the guide rollers 22, the wrench control ring 52 interacts with a slot 54 in the wrench arm 53 to control the position of the socket wrench 23 in order for it to be aligned with wheel nuts 55. Also similar to the setup of the guide rollers 22, the wrench control ring 52 is moved by an actuator 56, with the wrench control ring 52 moving along wrench ring rollers 57.

Figure 12:
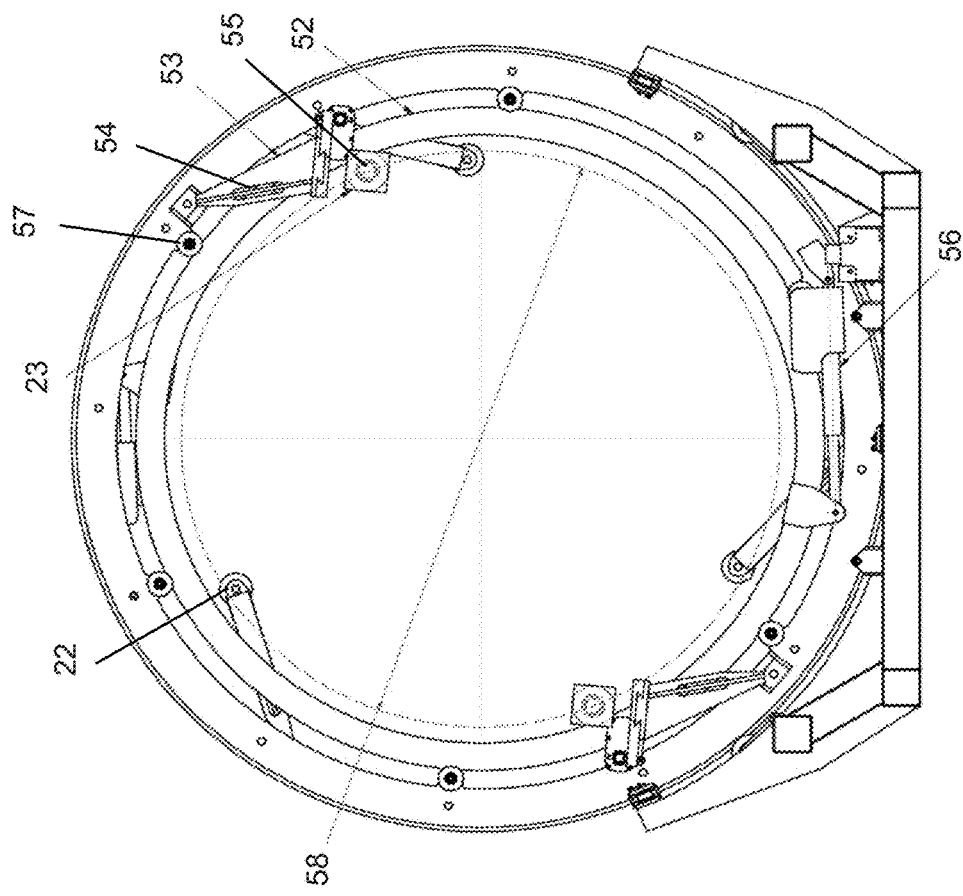
FIG. 12 illustrates a rear view of the apparatus with the socket wrenches in an outer location.
Figure 11:
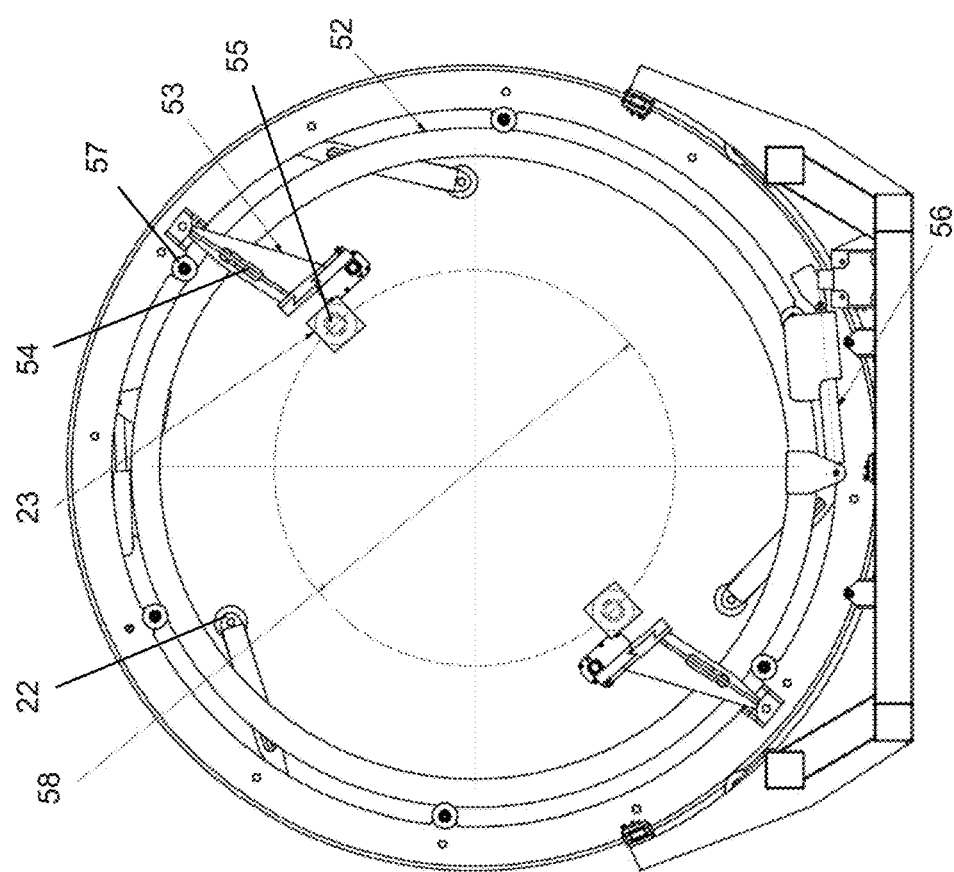
FIG. 11 illustrates a rear view of the apparatus with socket wrenches in a central location.

FIG. 11 shows the socket wrenches 23 aligned with particular wheel nuts 55. In the example embodiment, the rim 13 has a pitch circle diameter 58 (PCD) of 1050 mm. FIG. 12 shows the socket wrenches 23 aligned to suit a rim 13 with a larger PCD 58, which in the example embodiment is 1560 mm. As the wrench control ring 52 is offset to the positioning control ring 38 in a direction away from the wheel 12, it is possible for the apparatus 10 to be used with wheels 12 where the PCD 58 is smaller or larger than the rim 13 inner surface against which the guide rollers 22 engage.

Alternative embodiments may include a means for supplying and/or collecting wheel nuts 55 during fitting and/or removal procedures respectively (not shown in the Figures). During the fitting procedure, for example, the wheel nuts 55 may be stored in a magazine. As each wheel nut 55 is fitted, another wheel nut 55 from the magazine may be supplied to the socket wrench 23 or fitted to the wheel 12 ready to be tightened by the socket wrench 23. Similarly, during the removal procedure, as each wheel nut 55 is removed from the wheel 12 it may then be automatically taken from the socket wrench 23 and stored in the magazine. The use of a magazine or other similar means to store, supply and collect wheel nuts 55 allows the entire procedure to be automated.

Automating the process will also require various other sensors and processing components (not shown in the Figures). These extra components may include, but are not limited to, one or more processors, memory, automated input devices such as infra-red sensors, position sensors or code scanners, manual input devices such as a keypad or touchscreen, and an output device.

In one example embodiment, the memory will store data pertaining to a range of wheel models, such as the number of wheel nuts and the PCD. A user will then input the wheel type, allowing the apparatus to then complete a fitting or removal procedure automatically. Alternatively, the wheel may include a barcode or other identification that allows the apparatus to automatically determine the wheel parameters. This may also include the apparatus being connected to a remote database to retrieve information, such as via the internet or another means.

The apparatus 10 may also include a range of sensors to assist with alignment tasks, even if the expected wheel nut locations are known. In particular, sensors will likely be required during the initial alignment of the socket wrenches 23 with the wheel nuts 55 to rotate the ring assembly 20 initially, as the exact position of the wheel 12 will likely not be known. Once this initial alignment with one wheel nut 55 is completed, the apparatus can then automatically rotate and access other wheel nuts 55 according to the procedure specified for that wheel type. Other sensors may be employed, however, to ensure the procedure is progressing as anticipated.

Different embodiments of the invention will range from requiring significant user control through to being completely automatic. However, in all cases the invention provides increased safety to the user by removing them from the immediate vicinity of the wheel 12 and by placing at least the ring assembly 20 between the user and the wheel 12.

Figure 14:
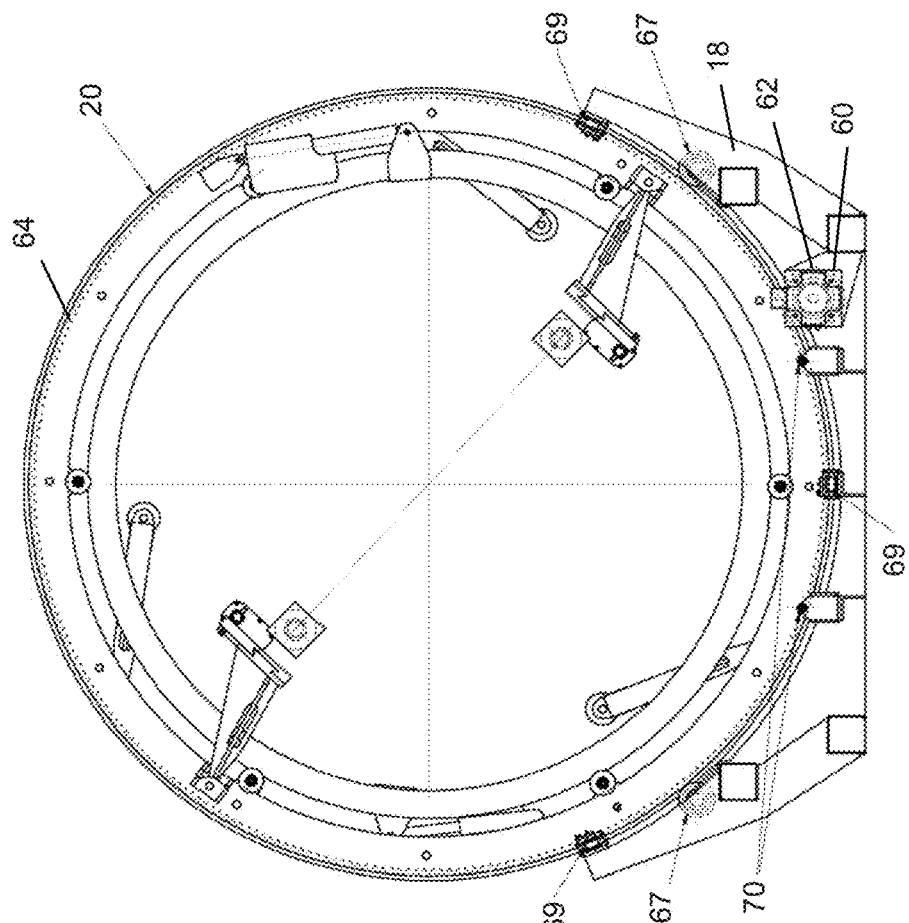
FIG. 14 illustrates a rear view of the apparatus with the ring assembly in a second position offset 90° to the first position.
Figure 13:
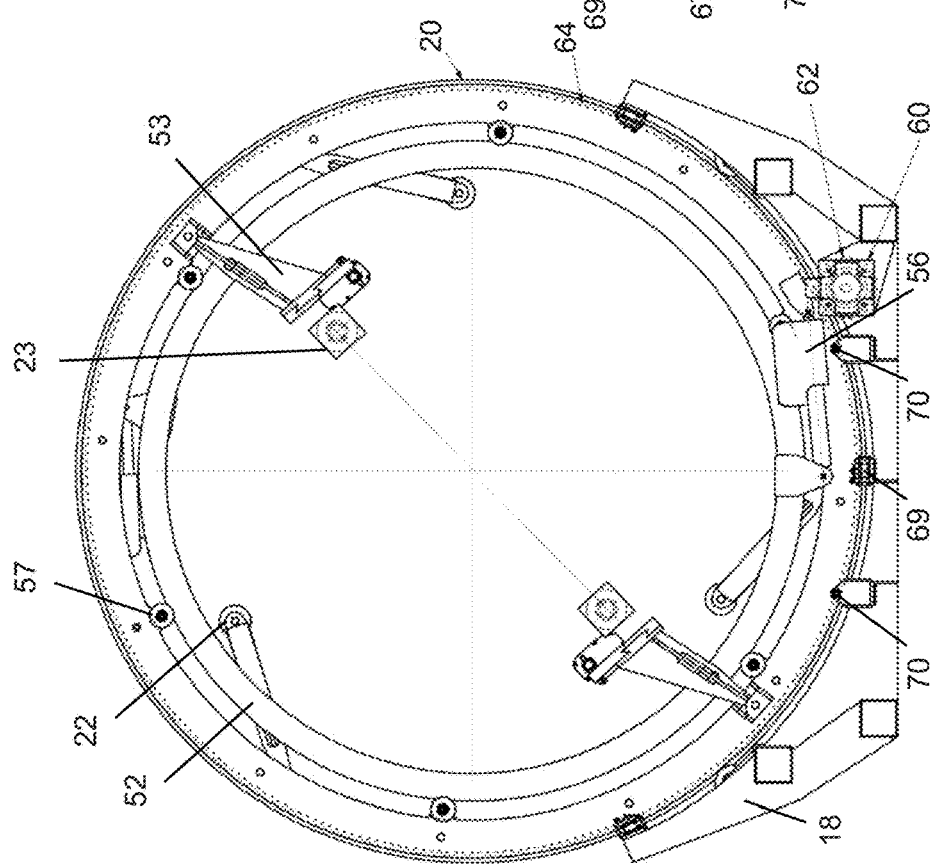
FIG. 13 illustrates a rear view of the apparatus with a ring assembly in a first position.
Figure 15:
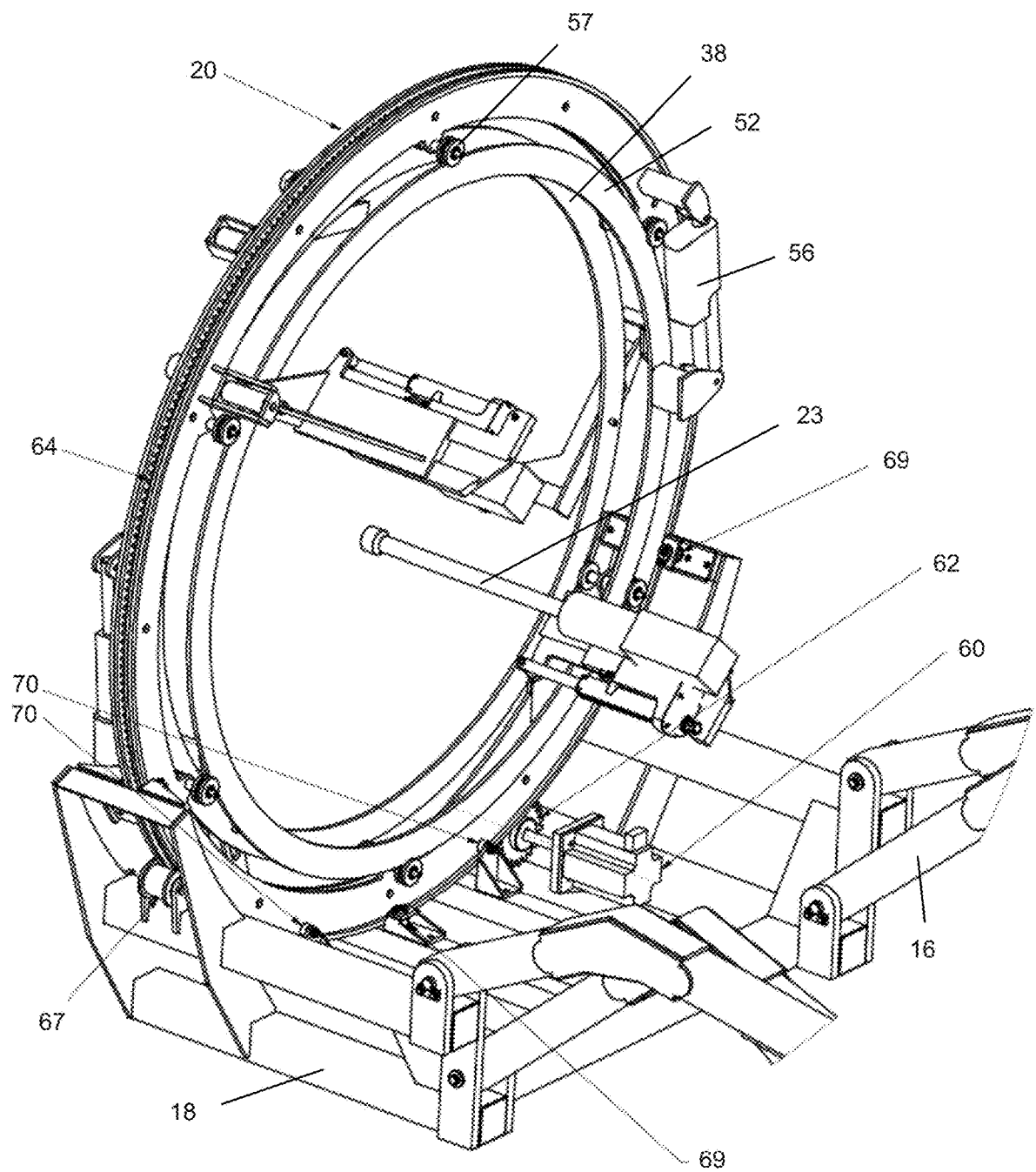
FIG. 15 illustrates a perspective view of the apparatus of FIG. 14.

FIGS. 13 to 15 show the rotation of the ring assembly 20. Referring to FIG. 13, the ring assembly 20 is shown in a first position. The entire ring assembly 20 is movable using motor 60, which drives a pinion gear 62 that in turn drives a ring gear 64 located around the periphery of the ring assembly 20. As shown in FIGS. 14 and 15, the ring assembly 20 sits on support rollers 67 and is secured and guided using side rollers 69 and hold down rollers 70.

By moving the entire ring assembly 20, the position of the guide rollers 22 and socket wrenches 23 relative to the rest of the ring assembly 20 stays the same. Therefore, after positioning the rollers 22 against the rim 13 and the socket wrenches 23 at the correct PCD 58, each successive wheel nut 55 can be accessed simply by rotating the entire ring assembly 20. This is illustrated by the comparison between FIG. 13 and FIG. 14, where the ring assembly 20 has been rotated 90° in FIG. 14 relative to the position in FIG. 13.

Figure 16:
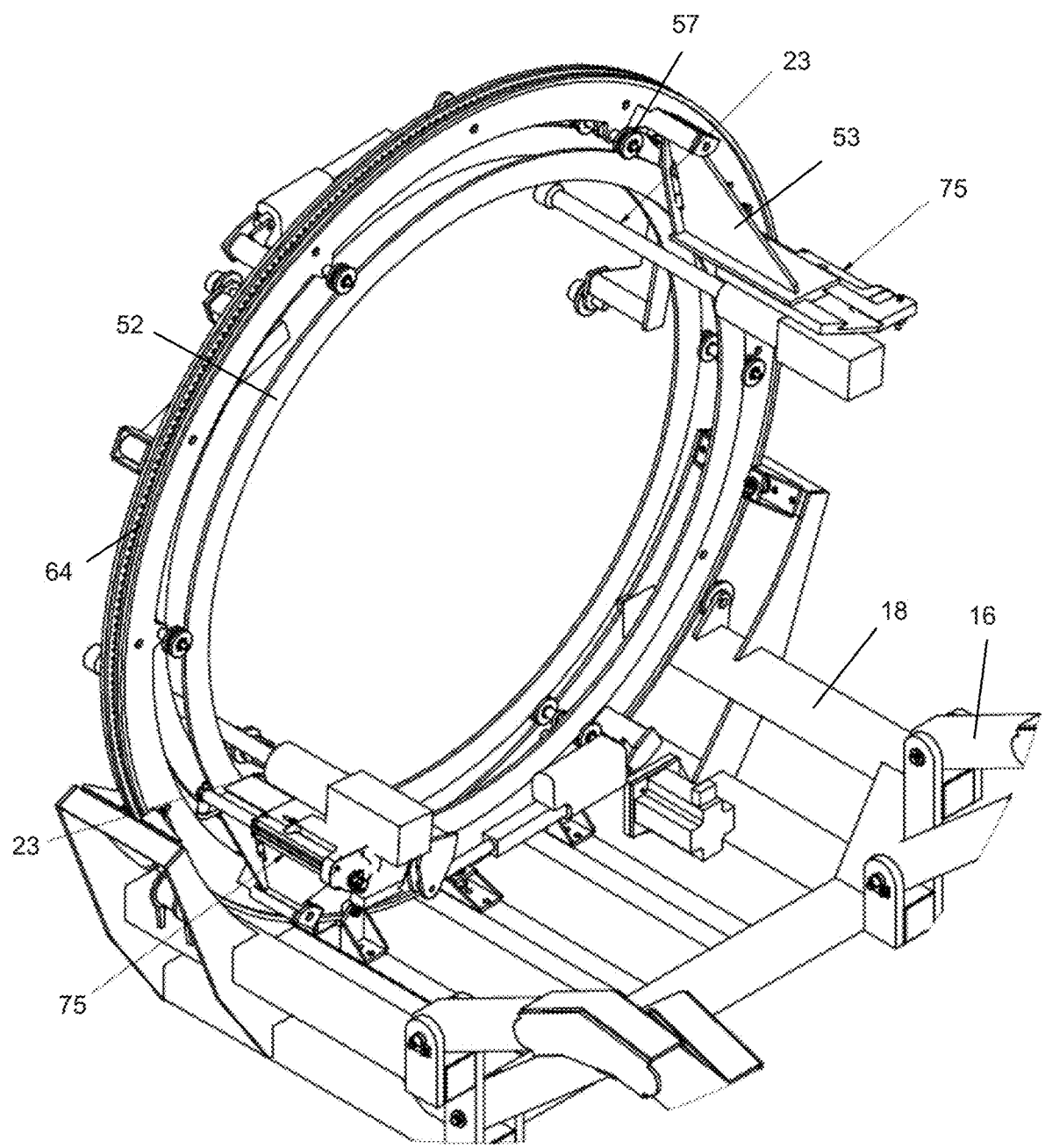
FIG. 16 illustrates a perspective view of the apparatus with a wrench extension actuator retracted.
Figure 17:
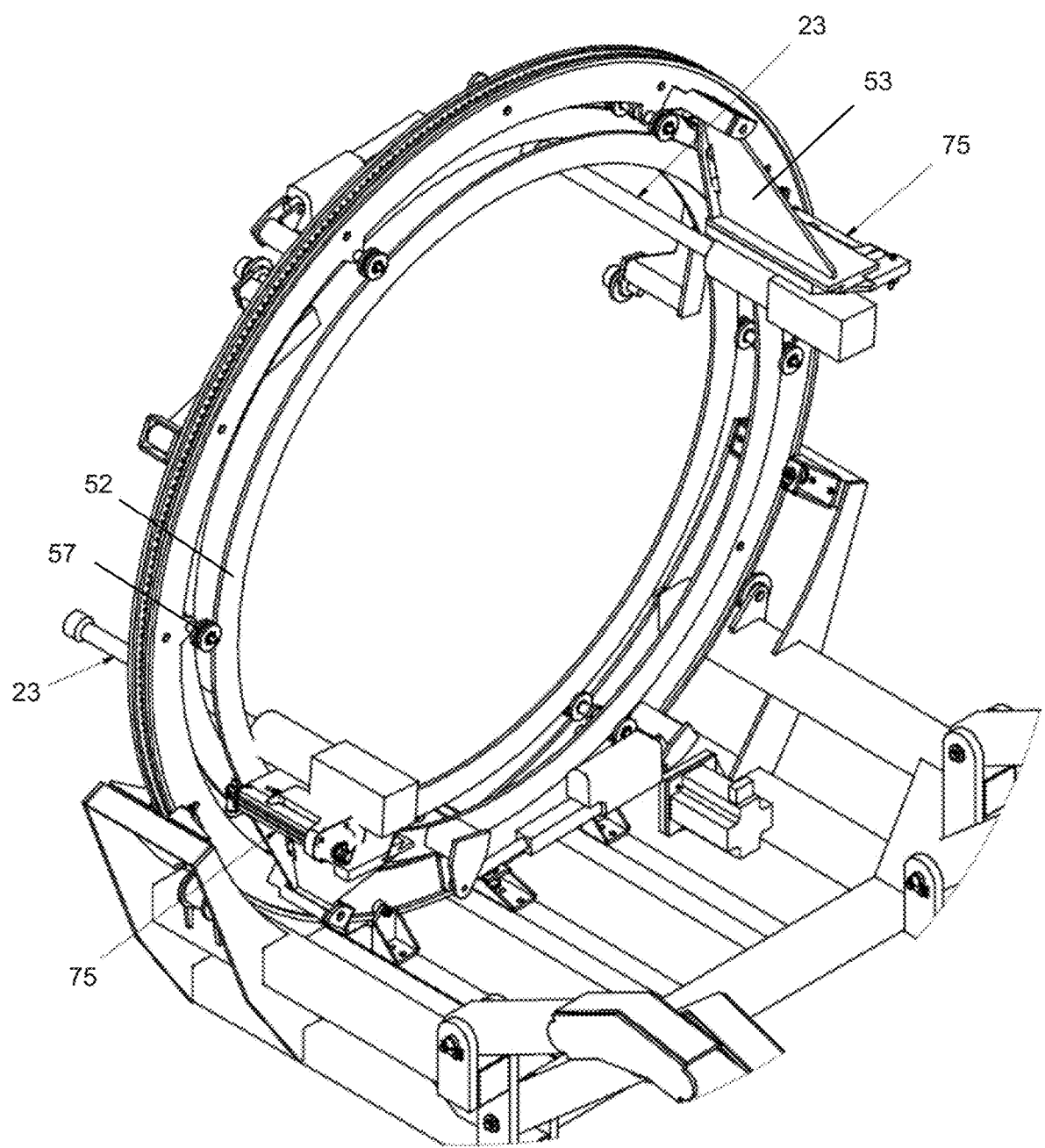
FIG. 17 illustrates a perspective view of the apparatus with the wrench extension actuator extended.

Referring to FIGS. 16 and 17, the socket wrenches 23 are each mounted on an extension actuator 75. Once the socket wrench 23 is positioned in the correct position relative to a wheel nut 55, the extension actuator 75 then moves the socket wrench 23 towards the wheel nut 55, allowing it to contact and then remove the wheel nut 55. FIG. 16 shows the extension actuator 75 in a retracted position and FIG. 17 shows the extension actuator 75 in an extended position.

The mounting of the ring assembly 20, using various rollers 67, 69, 70 near the periphery, means that the central part of the ring assembly 20 remains empty. This allows fitting and removing of inner and outer wheels 12 of a haul truck 100 or other vehicle. When requiring access to an inner wheel 12, the hub 80 from which the outer wheel 12 has been removed can fit through the inside of the ring assembly 20 (see FIG. 10), with space behind the ring assembly 20 to accommodate the hub 80.

The basic procedure for removing a wheel 12 begins with the carrier vehicle 15 being positioned adjacent to the wheel 12 to be removed, where vertical movement of the ring assembly 20 combined with movement of the carrier vehicle 15 allows the ring assembly 20 to be located in a position concentric with the wheel 12.

With the guide rollers 22 positioned in an inward location, the carrier vehicle 15 can then be driven forward so that the guide rollers 22 are within the rim 13. The guide rollers 22 are then moved outwardly, contacting the rim 13 and correcting for any small misalignment of the ring assembly 20 with the wheel 12.

Next, the socket wrenches 23 are moved so that they are at a diameter to match the PCD 58 and the ring assembly 20 is rotated so that the socket wrenches 23 are aligned with respective wheel nuts 55. The socket wrenches 23 are then moved forward using the extension actuators 75 and the wheel nuts 55 removed.

Once the first set of wheel nuts 55 are removed, the socket wrenches 23 are withdrawn, the removed wheel nuts 55 taken away and the ring assembly 20 rotated so that the socket wrenches 23 align with other wheel nuts 55.

In one example procedure, the ring assembly 20 is rotated a significant portion, such as about 90°, so that the wheel nuts 55 are removed evenly about the circumference, rather than immediately removing adjacent wheel nuts 55.

An equivalent, reverse procedure applies when fitting wheel nuts 55.

In alternative embodiments, the invention may incorporate a holding and lifting means to safely remove the wheel 12 from the hub 80 once the wheel nuts 55 are removed, or to place the wheel 12 on the hub 80 prior to installing the wheel nuts 55.

While the present invention has been described primarily in relation to a haul truck, it will be appreciated that the invention may be adapted for use with a wide range of mining and non-mining related equipment. Other examples of vehicles particularly suited to use with the invention include, but are not limited to, other mining vehicles such as loaders, scrapers, dump trucks and other lifters and handlers.

Many modifications will be apparent to those skilled in the art without departing from the scope of the present invention.

PARTS LIST

| | |
|---|---|
| 10 | Apparatus |
| 12 | Wheel |
| 13 | Rim |
| 14 | Tyre |
| 15 | Carrier vehicle |
| 16 | Lift arm |
| 17 | Lift actuator |
| 18 | Ring support frame |
| 20 | Rotating ring assembly |
| 22 | Guide roller |
| 23 | Socket wrench |
| 24 | Carrier vehicle wheel |
| 25 | Pivotal wheel mount |

-continued

| | |
|---|---|
| 27 | Vehicle mount |
| 28 | Vehicle mount pivot |
| 29 | Support frame mount |
| 30 | Support frame pivot |
| 32 | Wheel axis |
| 35 | Roller arm |
| 36 | Roller arm slot |
| 38 | Positioning control ring |
| 39 | Positioning ring roller |
| 40 | Positioning ring actuator |
| 42 | Roller circle |
| 43 | Roller circle diameter |
| 52 | Wrench control ring |
| 53 | Wrench arm |
| 54 | Wrench arm slot |
| 55 | Wheel nut |
| 56 | Wrench ring actuator |
| 57 | Wrench ring roller |
| 58 | Pitch Circle Diameter (PCD) |
| 60 | Ring assembly motor |
| 62 | Pinion gear |
| 64 | Ring gear |
| 67 | Ring assembly support roller |
| 69 | Ring assembly side roller |
| 70 | Ring assembly hold down roller |
| 75 | Nut wrench extension actuator |
| 80 | Hub |
| 100 | Haul truck |

The invention claimed is:

1. An apparatus for fitting and/or removing wheel nuts, the apparatus including a base structure that supports a movable wheel engaging portion, the wheel engaging portion including an annular rotatable member with a central void, the annular rotatable member supporting a socket wrench and a positioning device, wherein the positioning device can be used to locate the wheel engaging portion to aid the socket wrench to fit or remove a wheel nut; and
wherein the rotatable member includes an annular control ring coaxial with the rotatable member, such that rotating the annular ring relative to the rotatable member causes the socket wrench to be moved relative to the rotatable member.

2. The apparatus according to claim 1, wherein the positioning device is configured to locate the rotatable member in a position concentric to a wheel, such that rotation of the rotatable member allows the socket wrench to access subsequent wheel nuts.

3. The apparatus according to claim 1, wherein the socket wrench is movable in a direction towards or away from a central axis of the rotatable member.

4. The apparatus according to claim 1, wherein the socket wrench is extendable in a direction parallel to the axis of the rotatable member.

5. The apparatus according to claim 1, wherein the rotatable member has a central void, such that an inner wheel can be accessed by receiving an outer hub within the void.

6. The apparatus according to claim 1, wherein the apparatus includes a plurality of socket wrenches.

7. The apparatus according to claim 6, wherein the socket wrenches are evenly spaced around the rotatable member.

8. The apparatus according to claim 1, wherein the positioning device includes a rim engaging member.

9. The apparatus according to claim 1, wherein the apparatus is configured to automatically locate and remove all wheel nuts of a wheel fitted to a vehicle.

10. The apparatus according to claim 1, wherein the apparatus includes a wheel nut collection device and/or a wheel nut supply device.

11. The apparatus according to claim 1, wherein the apparatus includes a wheel holding device.

12. The apparatus according to claim 1, wherein the apparatus is configured to fit or remove wheel nuts to or from a mining vehicle.

13. The apparatus according to claim 1, wherein the apparatus is configured to fit or remove wheel nuts to or from an inner wheel of a haul truck.

14. A method for fitting and/or removing wheel nuts using the apparatus as claimed in claim 1, including the steps of positioning a wheel engaging portion of an apparatus using a positioning device; and fitting/removing a wheel nut using a socket wrench connected to the wheel engaging portion.

15. The method according to claim 14, further including the step of rotating the wheel engaging portion, thereby allowing the socket wrench to fit/remove subsequent wheel nuts.

* * * * *